UNITED STATES PATENT OFFICE.

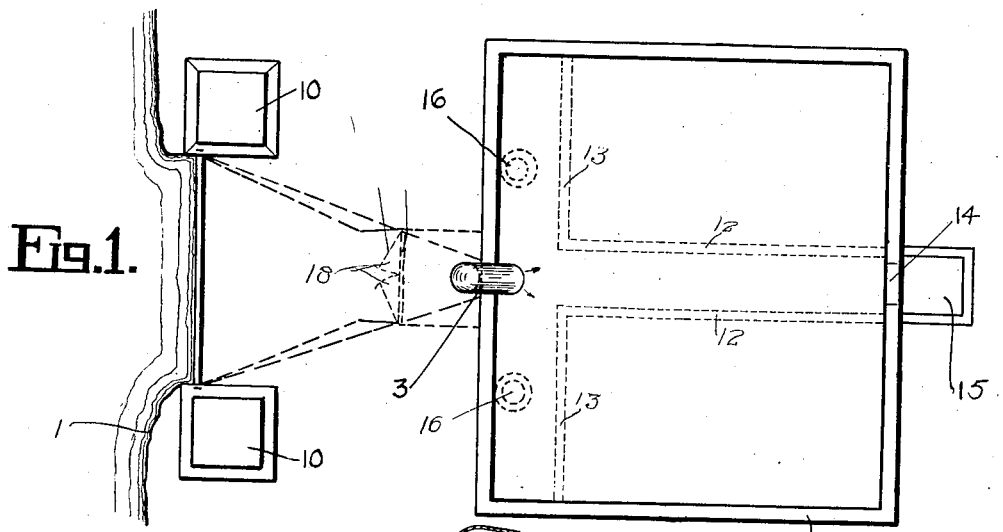
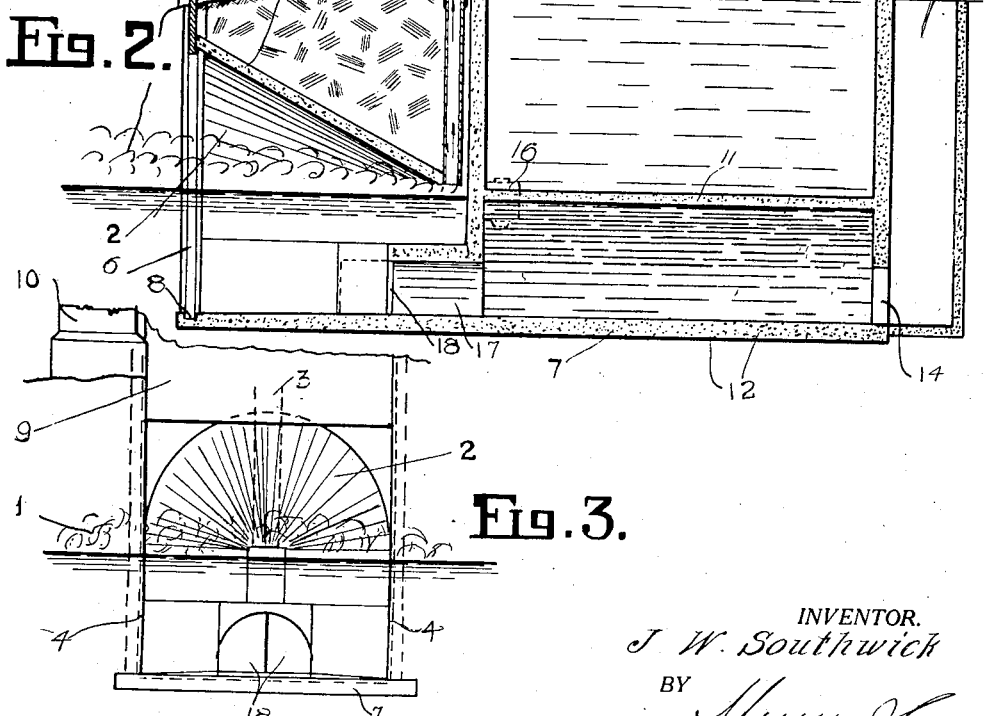

JOHN WARREN SOUTHWICK, OF NORTH COLLINS, NEW YORK.

WAVE-MOTOR.

1,347,829.   Specification of Letters Patent.   Patented July 27, 1920.

Application filed August 3, 1918, Serial No. 248,133. Renewed October 18, 1919. Serial No. 331,745.

*To all whom it may concern:*

Be it known that I, JOHN WARREN SOUTHWICK, a citizen of the United States, and a resident of North Collins, county of Erie, and State of New York, have invented certain new and useful Improvements in Wave-Motors, of which the following is a specification.

My invention is an improvement in wave motors, and has for its object to provide mechanism for converting the energy of waves into useful work.

In the drawings:

Figure 1 is a top plan view of the mechanism;

Fig. 2 is a longitudinal vertical section, and

Fig. 3 is an end view.

In the present embodiment of the invention a suitable reservoir 1 is provided, the said reservoir being formed from reinforced concrete or the like and of suitable size and arranged near the shore indicated at 1 in Fig. 1.

A funnel shaped passage 2 leads from the shore to the front wall of the reservoir, the small end of the passage being at the reservoir, and a vertical pipe 3 extends upwardly from the inner end of the funnel shaped passage above the front wall of the reservoir, the pipe having an elbow at this point delivering into the reservoir.

The passage 2 is formed by side walls 4 and a curved or arched top 5, and the top gradually decreases in height and width toward the pipe 3, while the side walls converge toward the said pipe, tending to compress or confine the water as it is forced inwardly through the passage by the incoming waves.

The side walls 4 of the passage have vertical grooves 6, and the base wall 7 of the reservoir and passage has the groove 8 registering with the grooves 6, for receiving a gate 9. This gate 9 is adapted to be raised and lowered as indicated in Fig. 2, and the gate is supported by pillars or towers 10 arranged at each side thereof.

Referring to Fig. 2, it will be seen that the bottom 11 of the reservoir is spaced above the base wall 7, being supported by walls 12 and 13 and by the side and rear walls of the reservoir. The walls 12 extend parallel with the side walls of the reservoir, to near the front wall, where they connect with the walls 13 which extend in opposite directions, substantially parallel with the front wall of the reservoir, but spaced apart therefrom, as shown. Between the rear ends of the walls 12 there is an opening 14 in the rear wall of the reservoir, and a species of hatchway 15 is provided for permitting access to the opening 14 and to the space between the walls 12, and the space between the walls 13 and the front wall of the reservoir.

The tank or reservoir 1 is a penstock, and suitable turbines 16 are arranged in the bottom of the reservoir near the front wall thereof and on each side of the pipe 3. These turbines receive water from the reservoir and deliver it to the space below the bottom wall 11 of the reservoir and between the walls 13, from whence it flows through a passage 17 and through valves 18 to return to the ocean on the return movement of the waves. These valves are in the form of gates, as shown in Fig. 3, which are hinged to the side walls 4 and which act as checks, closing when a wave sweeps inward, to open when the wave moves outward, to permit the water to discharge from the space below the bottom 11 of the reservoir or tank.

In operation, with the gate 9 in the position of Fig. 2, the waves sweep into the passage 2, and are driven up the vertical pipe 3, the water eventually flowing into the tank or reservoir. Thus a supply of water is provided for the turbines 16, and the water is discharged by the turbines into the space between the walls 13, from whence it flows by way of the passage 17 and valves 18 to the sea. When it is desired to shut off the water from the passage 2, for the purpose of repairs and the like, the gate 9 is lowered, and access is permitted to the space between the walls 13 by way of the hatchway 15 and the opening 14.

Referring to Fig. 2 it will be noticed that the pipe 3 is in sections, the upper section being slidable upon the lower section, in order that the discharge of the pipe may be raised and lowered.

I claim:

1. A device of the character specified, comprising a reservoir, a funnel shaped passage leading from the shore to the front wall of the reservoir and adapted to receive the breaking waves, a pipe leading from the small end of the passage upwardly and delivering to the reservoir, turbines in the bottom of the reservoir for utilizing the water therein, a passage beneath the reservoir leading from the turbines to the first named passage, check valves at the delivery end of the said last named passage for permitting the water to flow freely outward and for preventing the inflow of the water, a gate at the large end of the first named passage, and a hatchway leading to the passage beneath the reservoir for permitting access thereto.

2. A device of the character specified comprising a reservoir, a funnel shaped passage leading from the shore to the front wall of the reservoir to receive the breaking waves, a pipe leading upwardly from the small end of the passage and delivering to the reservoir, motors in the bottom of the reservoir for utilizing the water therein, a passage beneath the reservoir leading from the turbines to the water at the bottom of the funnel shaped passage, a passage or spillway beneath the reservoir leading from the turbines to the first named passage and delivering at the bottom thereof, and check valves at the delivery end of the said last named passage for permitting the water to flow freely outward and for preventing the inflow of water.

JOHN WARREN SOUTHWICK.